United States Patent
Cho

(10) Patent No.: US 7,905,806 B2
(45) Date of Patent: *Mar. 15, 2011

(54) POWER TRAIN FOR HYBRID ELECTRONIC VEHICLES AND METHOD OF CONTROLLING THE SAME

(75) Inventor: Sung-Tae Cho, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 489 days.

This patent is subject to a terminal disclaimer.

(21) Appl. No.: 11/646,284

(22) Filed: Dec. 26, 2006

(65) Prior Publication Data

US 2007/0184927 A1    Aug. 9, 2007

(30) Foreign Application Priority Data

Feb. 6, 2006    (KR) .................. 10-2006-0010953
Jun. 7, 2006    (KR) .................. 10-2006-0050805
Jun. 7, 2006    (KR) .................. 10-2006-0050808

(51) Int. Cl.
    *F16H 3/72*          (2006.01)
(52) U.S. Cl. .......................................... 475/5; 475/317
(58) Field of Classification Search .............. 475/5, 317; 903/911
See application file for complete search history.

(56) References Cited

U.S. PATENT DOCUMENTS

| | | | |
|---|---|---|---|
| 6,371,882 B1 | 4/2002 | Casey et al. | |
| 6,827,165 B2 | 12/2004 | Schmidt | |
| 7,294,079 B2 * | 11/2007 | Raghavan et al. | 475/5 |
| 7,393,298 B2 * | 7/2008 | Bucknor et al. | 475/5 |
| 2006/0148604 A1 * | 7/2006 | Raghavan et al. | 475/5 |
| 2006/0148605 A1 * | 7/2006 | Raghavan et al. | 475/5 |
| 2006/0148606 A1 * | 7/2006 | Bucknor et al. | 475/5 |
| 2007/0066432 A1 * | 3/2007 | Schmidt | 475/5 |

FOREIGN PATENT DOCUMENTS

| | | |
|---|---|---|
| JP | 2000-326739 | 11/2000 |
| JP | 2005-075095 | 3/2005 |
| JP | 2005-206058 A | 4/2005 |

* cited by examiner

*Primary Examiner* — Roger L Pang
*Assistant Examiner* — Erin D Bishop
(74) *Attorney, Agent, or Firm* — Morgan, Lewis & Bockius LLP

(57) ABSTRACT

A power train for hybrid vehicles increases the range of the transmission gear ratio within which the efficiency of the power train is superior. Furthermore, the method of operating the power train varies depending on the transmission gear ratio, and thus the power train can be operated with superior efficiency.

13 Claims, 15 Drawing Sheets

FIG.5
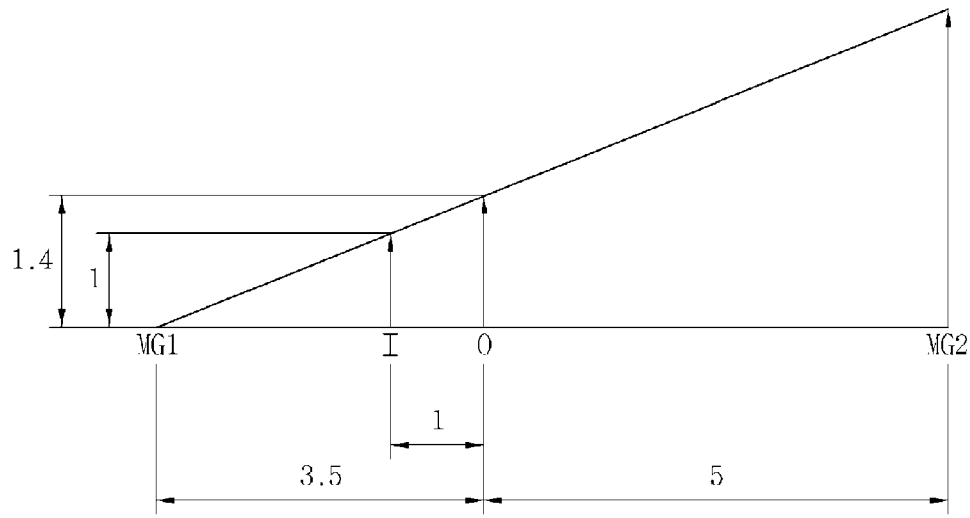
(A)
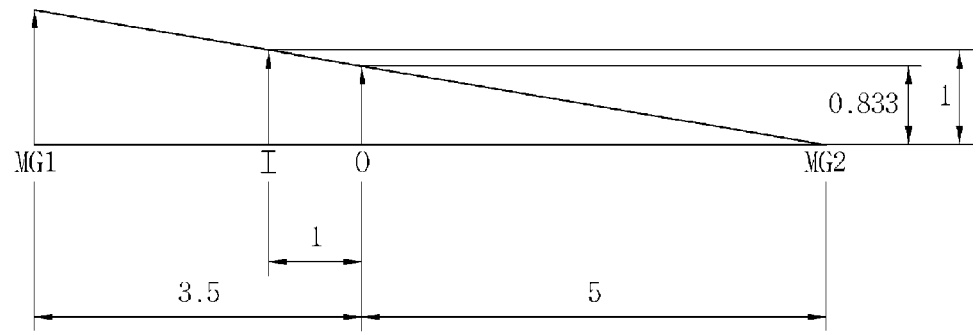
(B)

FIG.6
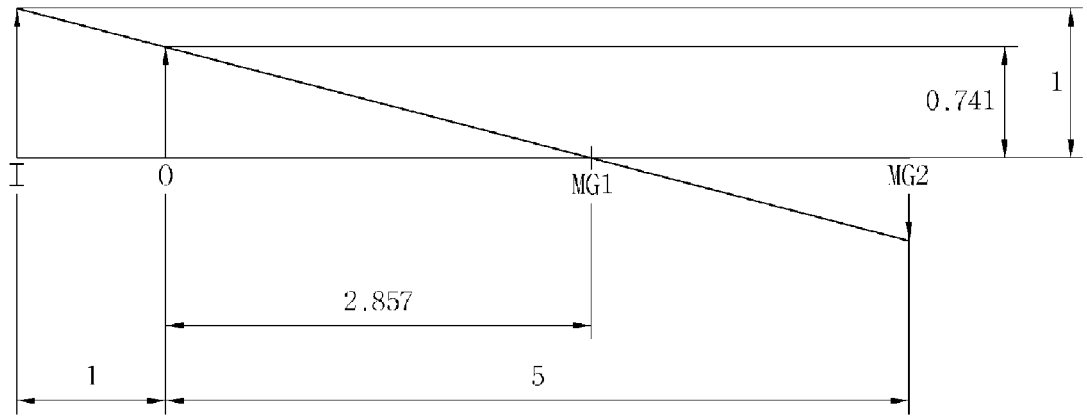
(A)
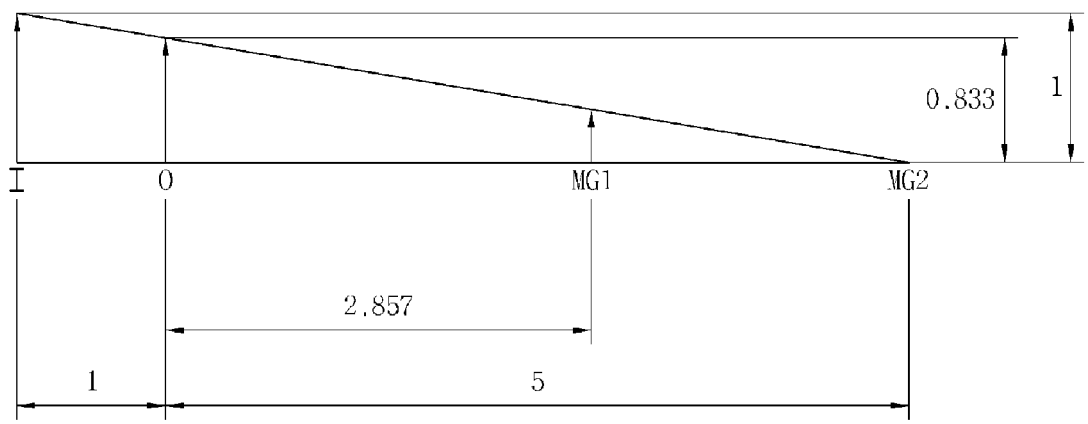
(B)

FIG.12
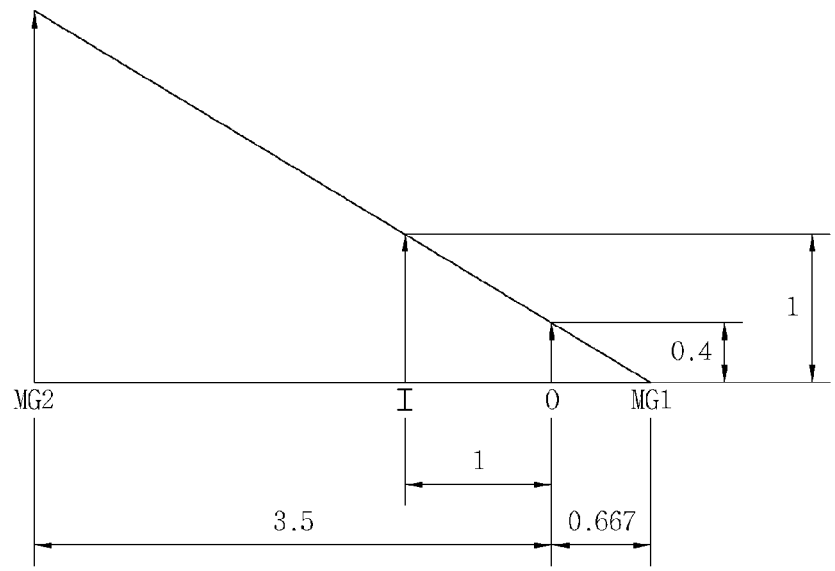
(A)
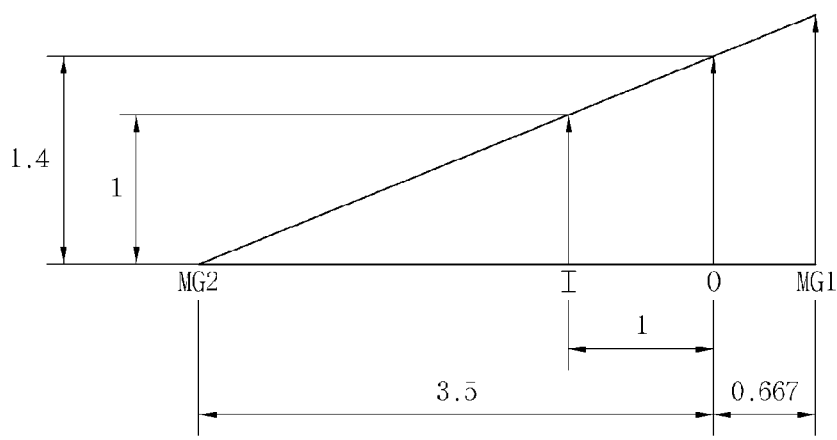
(B)

FIG.13
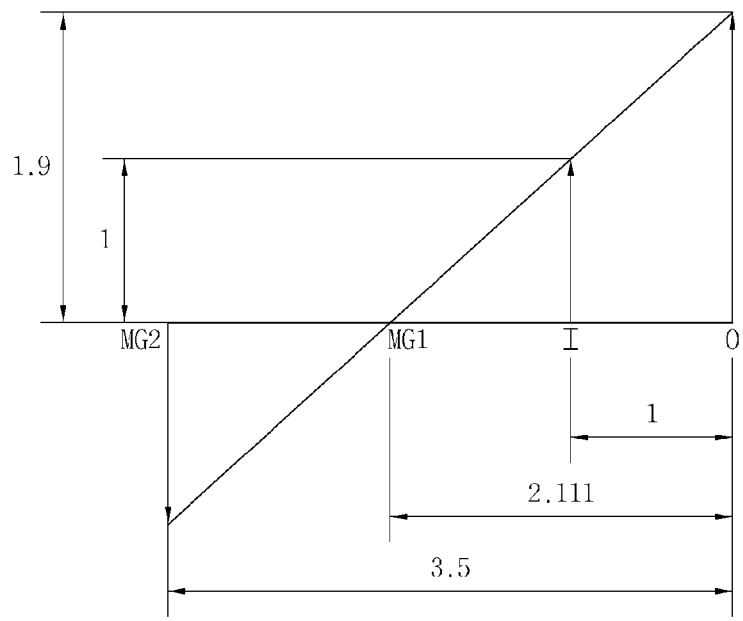
$$\text{transmission gear ratio} = \frac{V_I}{V_O} = \frac{1}{1.9} = 0.526 \quad \longleftarrow \quad \text{M2-1}$$
(A)
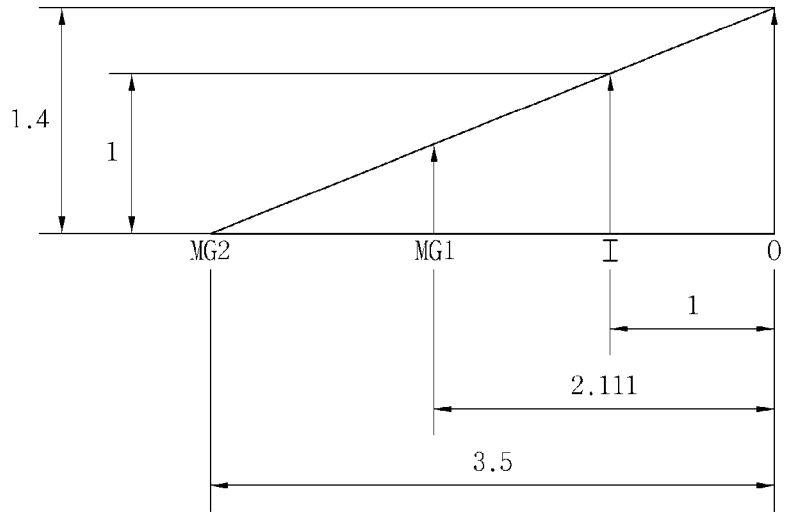
$$\text{transmission gear ratio} = \frac{V_I}{V_O} = \frac{1}{1.4} = 0.714 \quad \longleftarrow \quad \text{M2-2}$$
(B)

POWER TRAIN FOR HYBRID ELECTRONIC VEHICLES AND METHOD OF CONTROLLING THE SAME

CROSS-REFERENCE TO RELATED APPLICATIONS

The present application is based on, and claims priority from, Korean Applications Serial Number 10-2006-0050808, filed on Jun. 7, 2006, 10-2006-0050805, filed on Jun. 7, 2006 and 10-2006-0010953, filed on Feb. 6, 2006, the disclosures of which are hereby incorporated by reference herein in its entirety.

FIELD OF THE INVENTION

The present invention relates to a power train having dual modes for hybrid electric vehicles and to a method of controlling the power train and, more particularly, to a technique in which the method of operating the power train is varied depending on the transmission gear ratio of the vehicle, thus transmitting power more efficiently.

BACKGROUND OF THE INVENTION

As well known to those skilled in the art, a hybrid power transmission device using two planetary gear sets and two motor generators controls the speed of the motor generators without a separate transmission, and thus is able to serve as a variable transmission that is electrically operated. Furthermore, the hybrid power transmission device can operate in a motor mode, an engine mode, a hybrid mode and a regenerative braking mode by controlling the speed of the motor generators. Due to the hybrid power transmission device, if desired, the engine can be turned on or off, so that the fuel consumption ratio is increased. In addition, when braking, the hybrid power transmission device minimizes the use of a frictional brake and thus increases the efficiency of power recovery when braking.

An input split type power train, in which one of two motor generators is directly fixed to an output shaft, is a representative example of conventional power trains using two motor generators for hybrid electric vehicles.

The conventional input split type power train having the above-mentioned construction exhibits the highest efficiency at a transmission gear ratio which forms a mechanical point at which the speed of the other motor generator, which is not coupled to the output shaft, becomes zero. On the basis of this mechanical point, as the transmission gear ratio is increased or reduced, the efficiency of the power train is reduced. Such a reduction in efficiency of the power train when the transmission gear ratio is reduced is marked, compared to when the transmission gear ratio is increased.

In other words, the conventional power train is problematic in that, as the transmission gear ratio is reduced after passing the mechanical point (as the speed of the vehicle increases), the efficiency of the power train rapidly decreases.

SUMMARY OF THE INVENTION

Embodiments of the present invention provide a power train for hybrid vehicles and a method of controlling the power train which increase the range of the transmission gear ratio in which the efficiency of the power train is superior, so that the power train can maintain a relatively high efficiency even though the transmission gear ratio varies.

A power train having dual modes for hybrid electric vehicles according to an exemplary embodiment of the present invention includes an engine, gear sets and clutches. A first planetary gear set is provided with a first carrier coupled to the engine. A second planetary gear set has a second sun gear. A third planetary gear set has a third ring gear. A first clutch couples or decouples a second sun gear of the second planetary gear set to or from the third ring gear of the third planetary gear set. A second clutch converts the third ring gear of the third planetary gear set between a stationary state and a rotatable state. A first motor generator is coupled to either a third sun gear or a third carrier of the third planetary gear set. A second motor generator is coupled to either a first sun gear of the first planetary gear set or the second sun gear of the second planetary gear set. One element of either the first planetary gear set or the second planetary gear set is coupled to a drive wheel. Two elements of the first planetary gear set are coupled to two respective elements of the second planetary gear set. A remaining one of the third sun gear and the third carrier of the third planetary gear set which is not coupled to the first motor generator is coupled to one of the elements of the first planetary gear set and the second planetary gear set.

To control the power train, in the case where the first motor generator is coupled to the third carrier of the third planetary gear set, the second motor generator is coupled to the second sun gear of the second planetary gear set, a second carrier of the second planetary gear set is coupled to the drive wheel, the first sun gear of the first planetary gear set is coupled to a second ring gear of the second planetary gear set, a first ring gear of the first planetary gear set is coupled to the second carrier of the second planetary gear set, and the third sun gear of the third planetary gear set is coupled to the second ring gear of the second planetary gear set, whereas, on the basis of a mechanical point at which the speed of the second motor generator is zero, in a portion of a high transmission gear ratio region, the first clutch is engaged and the second clutch is engaged, and, in a low transmission gear ratio region, the first clutch is disengaged and the second clutch is engaged.

Furthermore, in the high transmission gear ratio region, relative to the mechanical point at which the speed of the second motor generator is zero, depending on the increase in the transmission gear ratio of the power train, when the efficiency of the power train in a state in which the first clutch is disengaged and the second clutch is engaged is higher than the efficiency of the power train in a state in which the first clutch is engaged and the second clutch is disengaged, the first clutch is disengaged, and the second clutch is engaged.

Meanwhile, in the case where the first motor generator is coupled to the third carrier of the third planetary gear set, the second motor generator is coupled to the first sun gear of the first planetary gear set, the second ring gear of the second planetary gear set is coupled to the drive wheel, the first sun gear of the first planetary gear set is coupled to the second sun gear of the second planetary gear set, the first carrier of the first planetary gear set is coupled to the second carrier of the second planetary gear set, and the third sun gear of the third planetary gear set is coupled to the first ring gear of the first planetary gear set, on the basis of a mechanical point at which the speed of the second motor generator is zero, in a high transmission gear ratio region, the first clutch is disengaged and the second clutch is engaged, and, in a low transmission gear ratio region, the first clutch is engaged and the second clutch is disengaged.

BRIEF DESCRIPTION OF THE DRAWINGS

For a better understanding of the nature and objects of the present invention, reference should be made to the following detailed description with the accompanying drawings, in which:

FIGS. 5 (A) and (B) are a lever analysis diagram showing formation of mechanical points in the first mode of the power train according to the first embodiment of the present invention;

FIGS. 6 (A) and (B) are a lever analysis diagram showing formation of mechanical points in the second mode of the power train according to the first embodiment of the present invention;

FIGS. 12 (A) and (B) are a lever analysis diagram showing formation of mechanical points in the first mode of the power train according to the second embodiment of the present invention;

FIGS. 13 (A) and (B) are a lever analysis diagram showing formation of mechanical points in the second mode of the power train according to the second embodiment of the present invention;

DETAILED DESCRIPTION OF THE PREFERRED EMBODIMENTS

Hereinafter, exemplary embodiments of the present invention will be described in detail with reference to the attached drawings.

Figure 1:
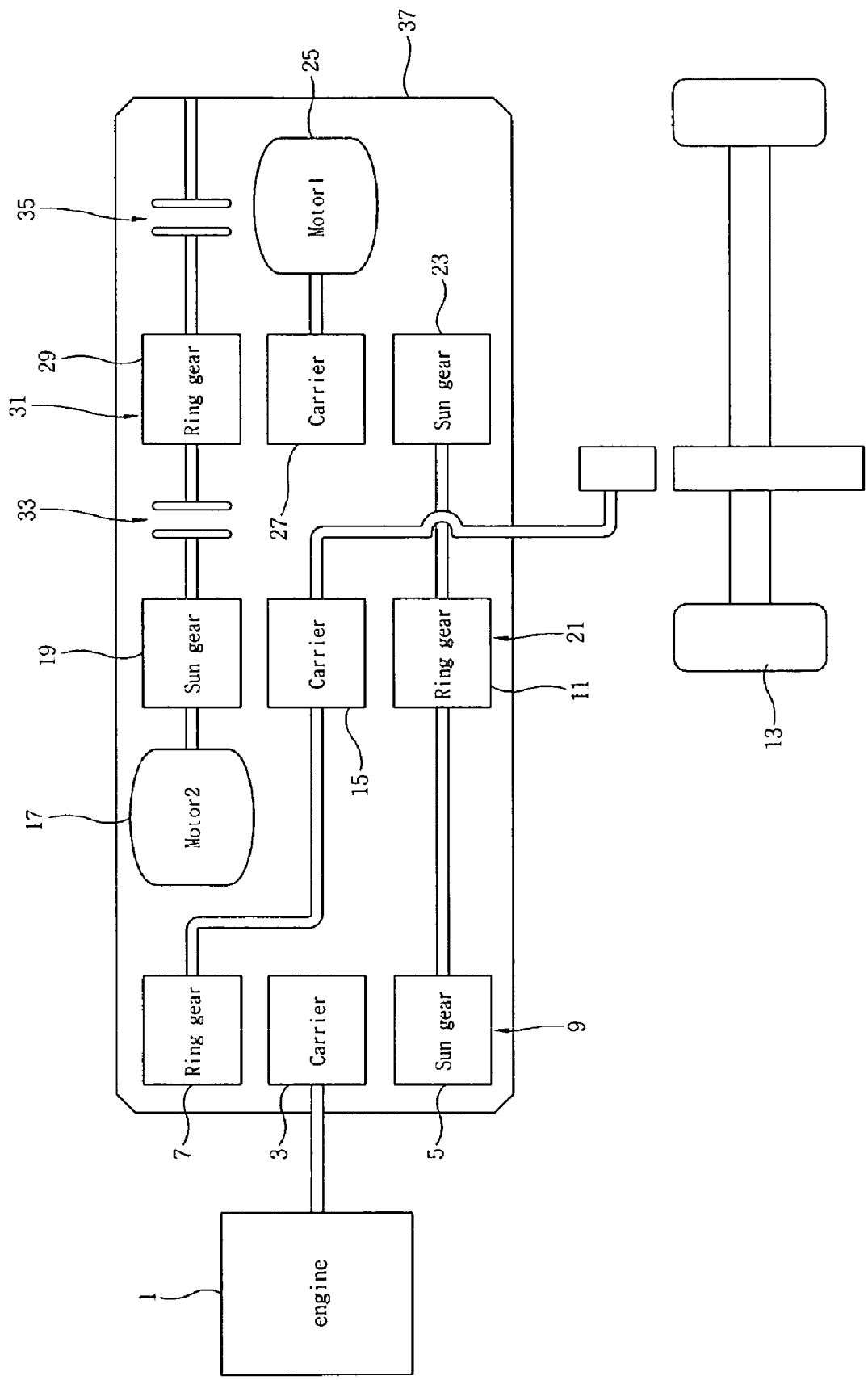
FIG. 1 is a schematic diagram of a power train having dual modes for hybrid electric vehicles, according to a first embodiment of the present invention.

Referring to FIG. 1, a power train according to the first embodiment of the present invention includes a first planetary gear set 9, a second planetary gear set 21, a third planetary gear set 31, a first clutch 33 and a second clutch 35. The first planetary gear set 9 includes a first carrier 3 coupled to an engine 1, a first sun gear 5, and a first ring gear 7. The second planetary gear set 21 includes a second ring gear 11 coupled to the first sun gear 5, a second carrier 15 coupled both to the first ring gear 7 and to a drive wheel 13, and a second sun gear 19 coupled to a second motor generator 17. The third planetary gear set 31 includes a third sun gear 23 coupled to the second ring gear 11, a third carrier 27 coupled to a first motor generator 25, and a third ring gear 29. The first clutch 33 couples or decouples the second sun gear 19 of the second planetary gear set 21 to or from the third ring gear 29 of the third planetary gear set 31. The second clutch 35 converts the third ring gear 29 of the third planetary gear set 31 between a stationary state and a rotatable state.

That is, the first motor generator 25 is coupled to the third carrier 27 of the third planetary gear set 31. The second motor generator 17 is coupled to the second sun gear 19 of the second planetary gear set 21. The second carrier 15 of the second planetary gear set 21 is coupled to the drive wheel 13. The first sun gear 5 of the first planetary gear set 9 is coupled to the second ring gear 11 of the second planetary gear set 21. The first ring gear 7 of the first planetary gear set 9 is coupled to the second carrier 15 of the second planetary gear set 21. The third sun gear 23 of the third planetary gear set 31 is coupled to the second ring gear 11 of the second planetary gear set 21.

In this embodiment, the second clutch 35 is provided between a power train case 37 and the third ring gear 29 of the third planetary gear set 31 to convert the third ring gear 29 between a stationary state and a rotatable state relative to the power train case 37. The second clutch 35 may be provided between the third ring gear 29 and a separate vehicle body part other than the power train case 37. Each of the first planetary gear set 9, the second planetary gear set 21 and the third planetary gear set 31 comprises a single pinion planetary gear.

The power train having the above-mentioned construction is operated in a first mode or in a second mode, each of which is a compound split mode, depending on the states of the first and second clutches 33 and 35.

Figure 2:
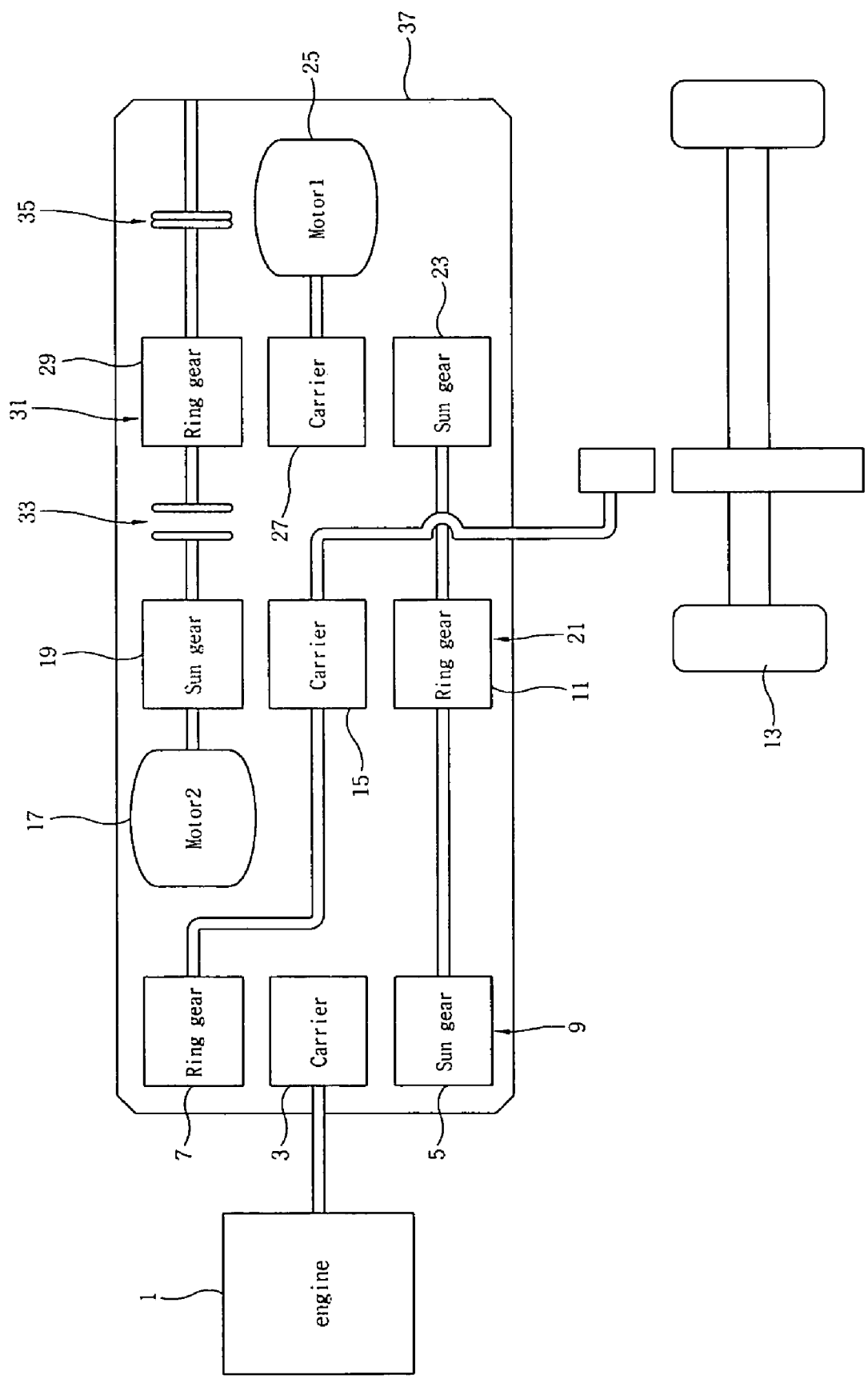
FIG. 2 is a schematic diagram of the power train of FIG. 1, which is operated in a first mode.
Figure 3:
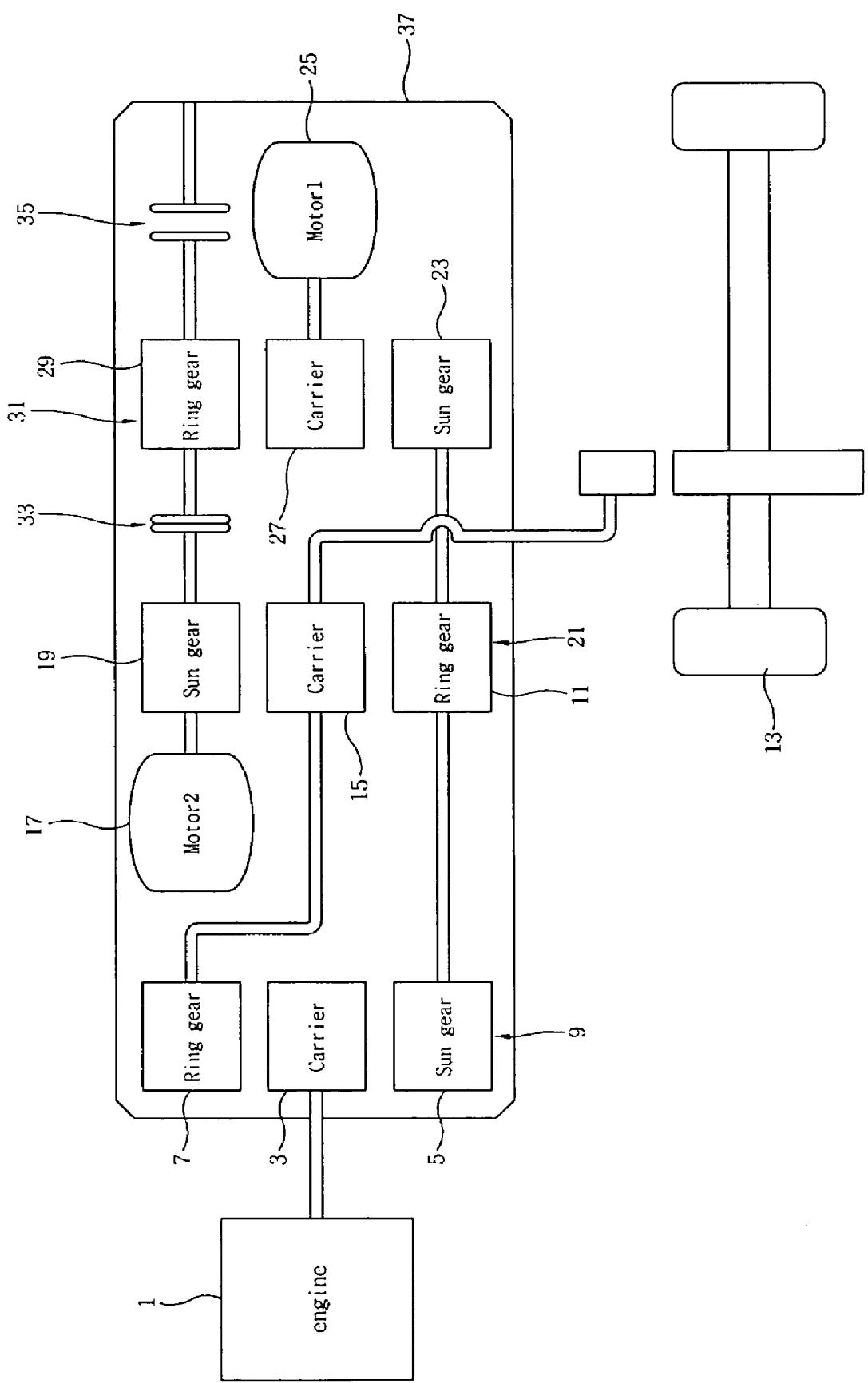
FIG. 3 is a schematic diagram of the power train of FIG. 1, which is operated in a second mode.

Hereinafter, the case of FIG. 2, in which the first clutch 33 is in a disengaged state while the second clutch 35 is in an engaged state, will be called the first mode, and the case of FIG. 3, in which the first clutch 33 is in an engaged state while the second clutch 35 is in a disengaged state, will be called the second mode.

Figure 4:
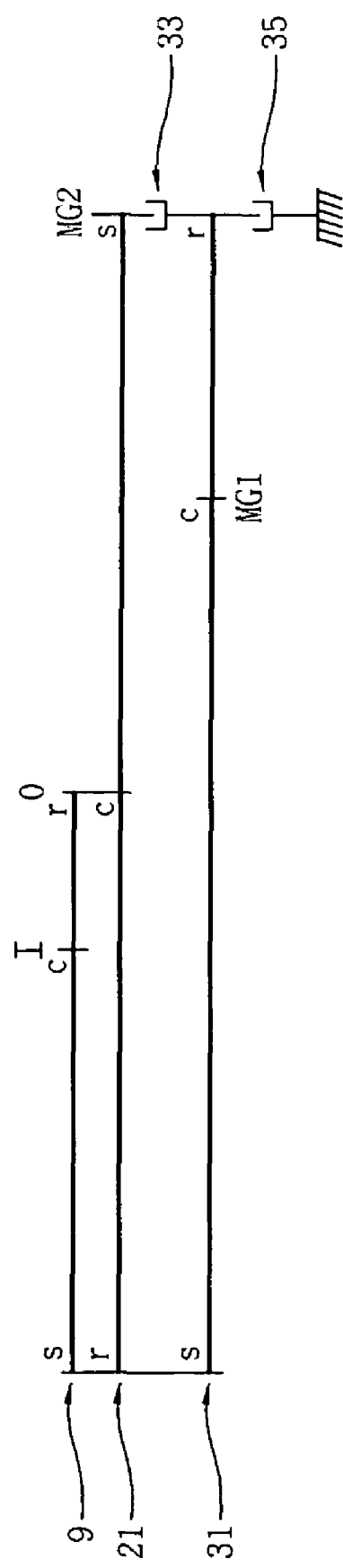
FIG. 4 is a lever analysis diagram of the power train of FIG. 1.

FIG. 4 is a lever analysis diagram of the power train of the first embodiment. FIG. 5 is a lever analysis diagram of some states of the power train being operated in the first mode. In FIG. 5, the upper view illustrates a transmission gear ratio that forms a mechanical point M1-1 at which the speed of the first motor generator 25 is zero, and the lower view illustrates a transmission gear ratio that forms a mechanical point M1-2 at which the speed of the second motor generator 17 is zero.

In the case where the power train of the present invention is in the first mode, the two mechanical points M1-1 and M1-2 shown in FIG. 5 are attained while the transmission gear ratio is varied. Supposing that no battery is provided between the first motor generator 25 and the second motor generator 17, that electricity that is generated at one side is completely consumed by the other side, so that the sum of the generated and wasted amounts is zero, and that energy loss for maintaining the speed of the motor generator at zero is negligible, the efficiency of the power train becomes 1, which is the maximum value, at the two mechanical points. This is confirmed in the graph of FIG. 7, which illustrates the efficiency of the power train depending on variation in the transmission gear ratio.

Figure 7:
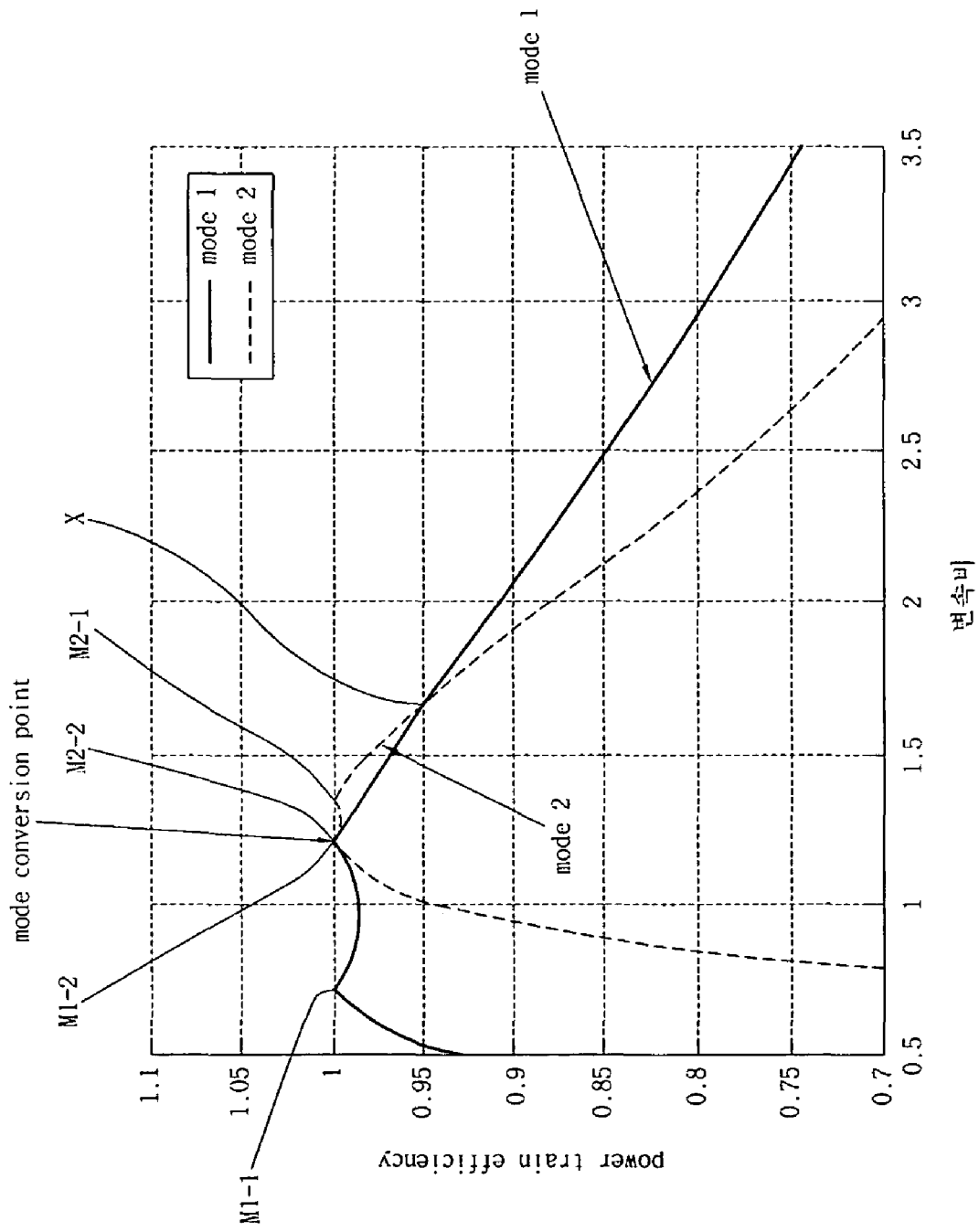
FIG. 7 is a graph showing the efficiency of the power train as a function of a transmission gear ratio according to a method of controlling the power train of the first embodiment.

Referring to FIG. 7, it can be seen that the line that shows the efficiency in the first mode attains the maximum efficiency value of "1" twice. Furthermore, it can be seen that the positions at which the efficiency of the power train is maximum are the two mechanical points M1-1 and M1-2 of the power train in the first mode. In addition, as will be explained later herein, it can be seen that the efficiency in the first mode is lower than in the second mode in a portion of the region in which the transmission gear ratio is increased from the position designated as a mode conversion point, and the efficiency in the first mode is higher than in the second mode in the region in which the transmission gear ratio is reduced from the mode conversion point.

For reference, in FIGS. 4 through 6, the character O denotes output, I denotes input (engine), MG1 denotes the first motor generator, and MG2 denotes the second motor generator.

I is spaced apart from O by a distance of 1.

When a distance from O to MG1 is α and a distance from O to MG2 is β, in the case of the first mode, α=−3.5 and β=−5. In the case of the second mode, α=−2.857 and β=−5. It is understood that both the first mode and the second mode are compound split modes because α and β are not zero. The distances from O to 1, MG1 and MG2 correspond to gear ratios in the real power train.

The graph of FIG. 7 is defined by the following Equation. 1:

$$eff = \left[ -1 + \frac{\eta_a\{(\gamma-1)\alpha+1\} - \eta_b\{(\gamma-1)\beta+1\}}{\alpha\beta(\gamma-1)(\eta_a-\eta_b)+(\eta_a\beta-\eta_b\alpha)} \right] \times \frac{1}{\gamma} \quad \text{[Equation 1]}$$

Here, eff denotes the efficiency of the power train.

α and β denote the above-mentioned values depending on the mode.

γ denotes the transmission gear ratio.

$\eta_a$ and $\eta_b$ respectively denote efficiencies when the first motor generator 25 and the second motor generator 17 are charged and discharged (consumed). Here, 0.949 and 1/0.951 are used as values of $\eta_a$ and $\eta_b$. That is, when charged, it has a value less than 1 (in this case, 0.949). When discharged, it has a value greater than 1 (in this case, 1/0.951).

FIG. 6 is lever analysis diagrams of some states of the power train being operated in the second mode. In FIG. 6, the upper view shows a transmission gear ratio that forms a mechanical point M2-1 at which the speed of the first motor generator 25 is zero, and the lower view shows a transmission gear ratio that forms a mechanical point M2-2 at which the speed of the second motor generator 17 is zero.

As such, in the second mode, the two mechanical points M2-1 and M2-2 shown in FIG. 6 are attained while the transmission gear ratio is varied. Supposing that no battery is provided between the first motor generator 25 and the second motor generator 17, that electricity that is generated at one side is completely consumed by the other side so that the sum of the generated and wasted amounts is zero, and that energy loss for maintaining the speed of the motor generator at zero is negligible, the efficiency of the power train becomes 1, which is the maximum value, at the two mechanical points. This is confirmed in the graph of FIG. 7, which illustrates the efficiency of the power train depending on variation in the transmission gear ratio.

Referring to FIG. 7, it can be seen that the line that shows the efficiency of the power train in the second mode attains the maximum efficiency value of "1" twice. Furthermore, it can be seen that the positions at which the efficiency of the power train is maximum are the mechanical points M2-1 and M2-2 of the power train in the second mode, and, at the position designated as the mode conversion point, the efficiency of the power train in the first mode is maximum and, simultaneously, the efficiency thereof in the second mode is also maximum, that is, the mechanical points M1-2 and M2-2 are the same. Furthermore, it is understood that, because the mechanical point M2-1 is located to the right of the mode conversion point, the efficiency of the power train in the second mode is higher than in the first mode in the area around the mechanical point.

The mode conversion point corresponds to a transmission gear ratio at which the speed of the second motor generator 17 in the first mode becomes zero, and also corresponds to a transmission gear ratio at which the speed of the second motor generator 17 in the second mode becomes zero.

Therefore, in the present invention, on the basis of the mode conversion point, which is the mechanical point at which the speed of the second motor generator 17 is zero, in the region where the transmission gear ratio is lower, the first clutch 33 is disengaged and the second clutch 35 is engaged such that the power train is operated in the first mode. In a portion of the region where the transmission gear ratio is higher, the first clutch 33 is engaged and the second clutch 35 is disengaged such that the power train is operated in the second mode. Thus, the range of the transmission gear ratio in which the efficiency of the power train is superior is increased, so that the power train can maintain a relatively high efficiency even though the transmission gear ratio is varied.

As shown in FIG. 7, the graph of the second mode crosses the graph of the first mode at point X in the region where the transmission gear ratio is increased from the mode conversion point. As the transmission gear ratio is increased from the point X, the efficiency of the first mode, in which the first clutch 33 is in the disengaged state while the second clutch 35 is in the engaged state, becomes higher than the efficiency of the second mode, in which the first clutch 33 is in the engaged state while the second clutch 35 is in the disengaged state. Therefore, to operate the power train more efficiently, in the region where the transmission gear ratio is increased from the point X, the first clutch 33 is disengaged and the second clutch 35 is engaged such that the power train is operated in the first mode again.

Meanwhile, in the first mode and the second mode, the first motor generator 25 and the second motor generator 17 alternately conduct charging and discharging depending on the transmission gear ratio. The power generated by the first or second motor generator 25 or 17 is added to the power of the engine 1 and transmitted to the drive wheel 13.

Figure 8:
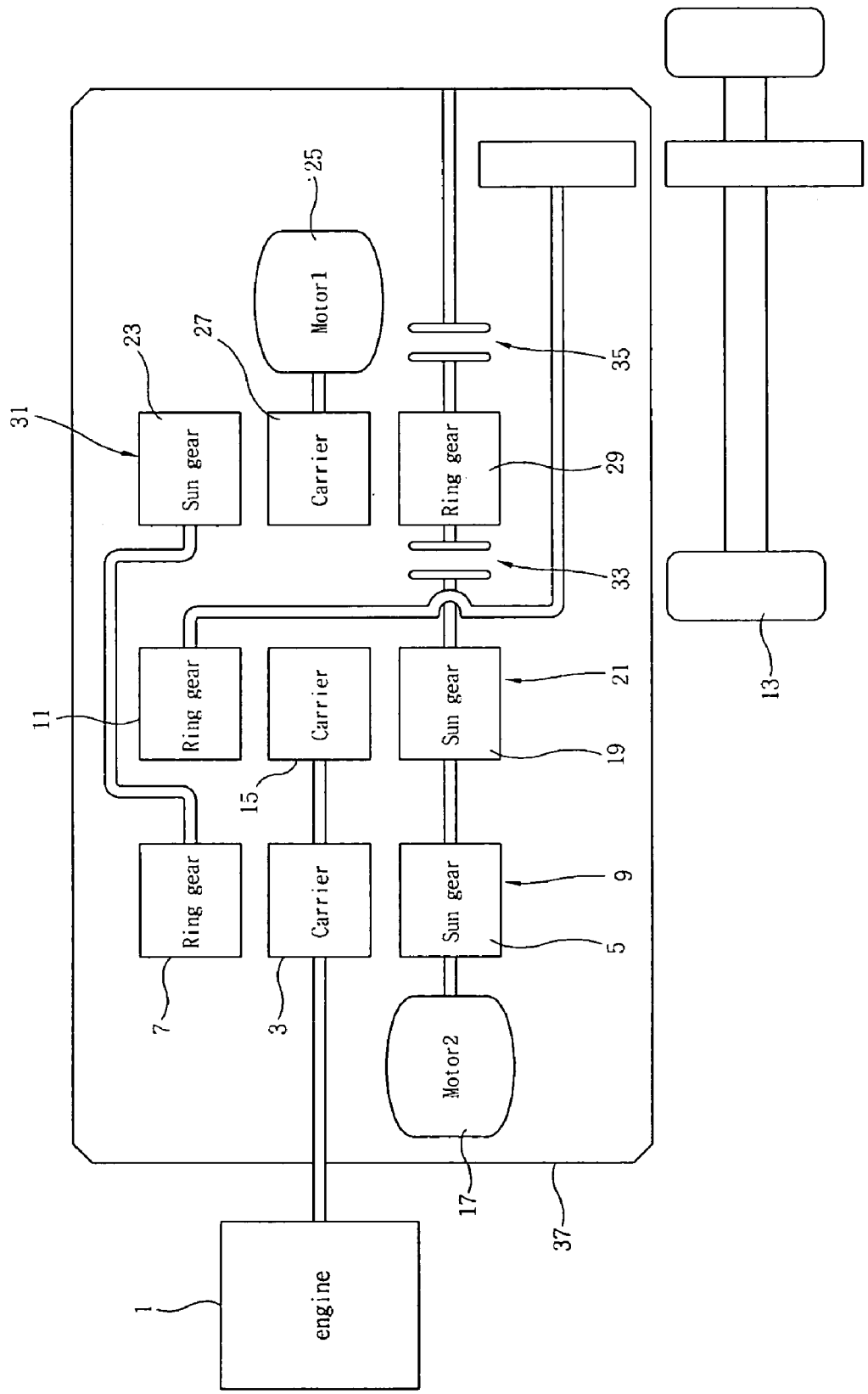
FIG. 8 is a schematic diagram of a power train having dual modes for hybrid electric vehicles, according to a second embodiment of the present invention.

Referring to FIG. 8, a power train according to a second embodiment of the present invention includes a first planetary gear set 9, a second planetary gear set 21, a third planetary gear set 31, a first clutch 33 and a second clutch 35. The first planetary gear set 9 includes a first carrier 3 coupled to an engine 1, a first sun gear 5 coupled to a second motor generator 17, and a first ring gear 7. The second planetary gear set 21 includes a second sun gear 19 coupled to the first sun gear 5, a second carrier 15 coupled to the first carrier 3, and a second ring gear 11 coupled to a drive wheel 13. The third planetary gear set 31 includes a third sun gear 23 coupled to the first ring gear 7, a third carrier 27 coupled to a first motor generator 25, and a third ring gear 29. The first clutch 33 couples or decouples the second sun gear 19 of the second planetary gear set 21 to or from the third ring gear 29 of the third planetary gear set 31. The second clutch 35 converts the third ring gear 29 of the third planetary gear set 31 between a stationary state and a rotatable state.

That is, the first motor generator 25 is coupled to the third carrier 27 of the third planetary gear set 31. The second motor generator 17 is coupled to the first sun gear 5 of the first planetary gear set 9. The second ring gear 11 of the second planetary gear set 21 is coupled to the drive wheel 13. The first sun gear 5 of the first planetary gear set 9 is coupled to the second sun gear 19 of the second planetary gear set 21. The first carrier 3 of the first planetary gear set 9 is coupled to the second carrier 15 of the second planetary gear set 21. The third sun gear 23 of the third planetary gear set 31 is coupled to the first ring gear 7 of the first planetary gear set 9.

In this embodiment, the second clutch 35 is provided between a power train case 37 and the third ring gear 29 of the third planetary gear set 31 to convert the third ring gear 29 between a stationary state and a rotatable state relative to the power train case 37. The second clutch 35 may be provided between the third ring gear 29 and a separate vehicle body part other than the power train case 37. Each of the first planetary gear set 9, the second planetary gear set 21 and the third planetary gear set 31 comprises a single pinion planetary gear.

The power train having the above-mentioned construction is operated in a first mode or in a second mode, each of which is a compound split mode, depending on the states of the first and second clutches 33 and 35.

Figure 9:
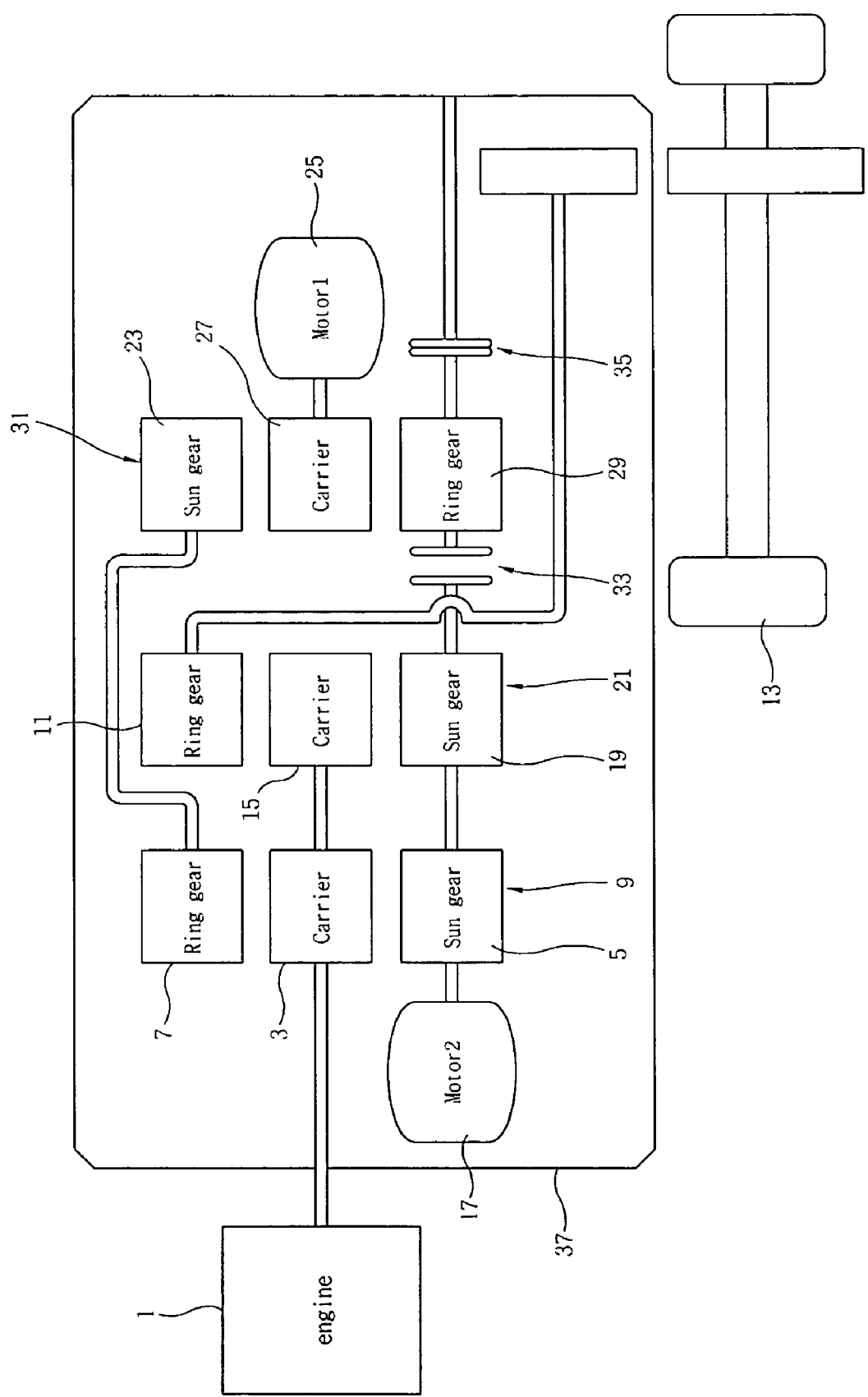
FIG. 9 is a schematic diagram of the dual power train of FIG. 8 which is operated by a first mode.
Figure 10:
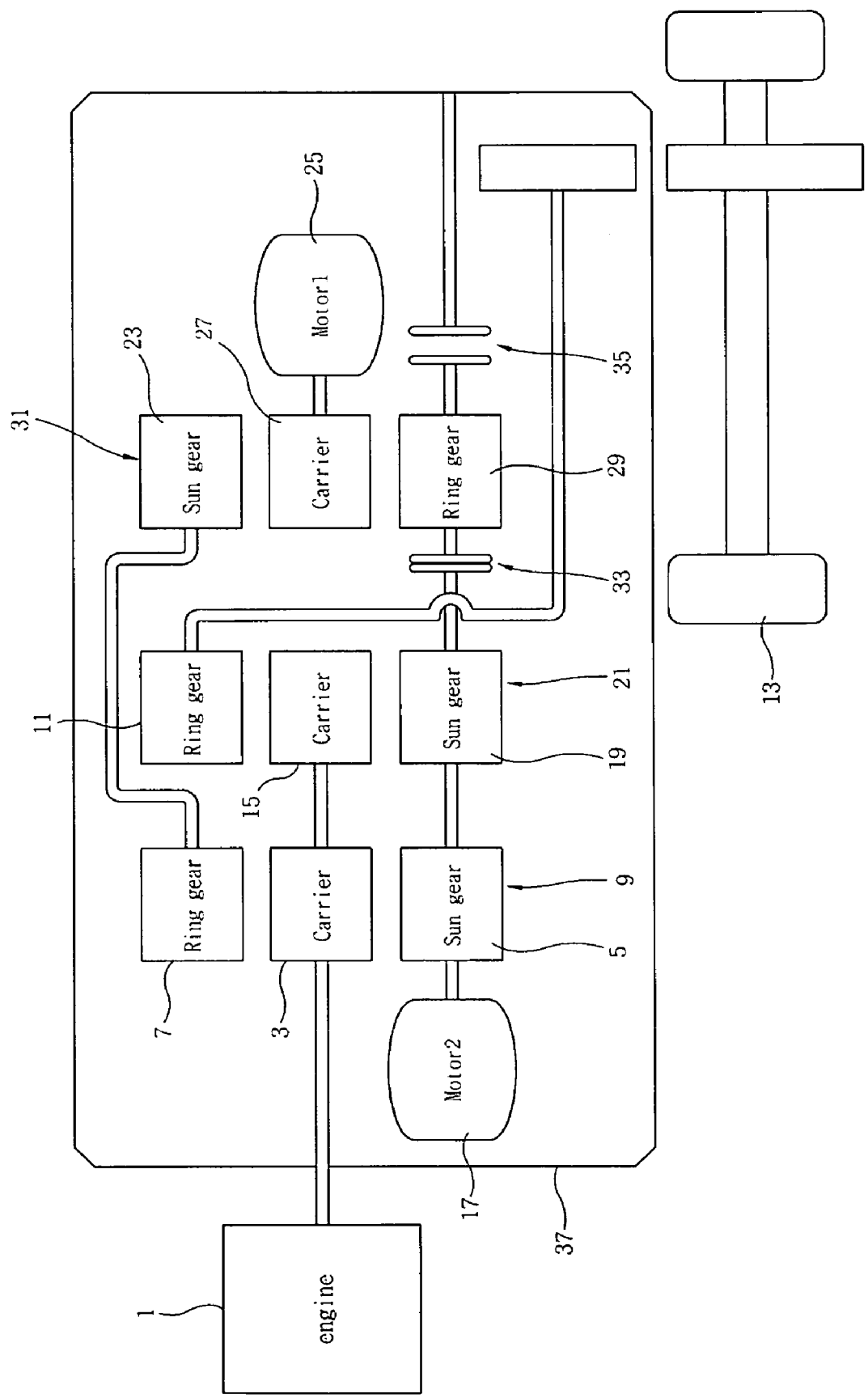
FIG. 10 is a schematic diagram of the power train of FIG. 8 which is operated by a second mode.

Hereinafter, the case of FIG. 9, in which the first clutch 33 is in a disengaged state while the second clutch 35 is in a engaged state, will be called the first mode, and the case of FIG. 10, in which the first clutch 33 is in a engaged state while the second clutch 35 is in a disengaged state, will be called the second mode.

Figure 11:
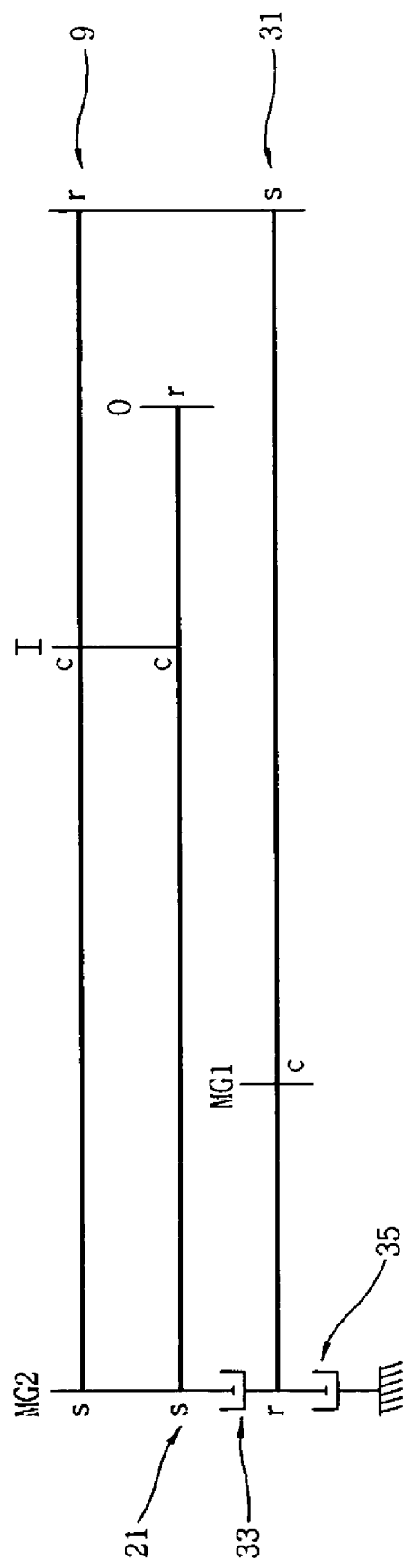
FIG. 11 is a lever analysis diagram of the power train of FIG. 8.

FIG. 11 is a lever analysis diagram of the power train according to the second embodiment. FIG. 12 is lever analysis diagrams showing some states of the power train while operated by the first mode. In FIG. 12, the upper view illustrates a transmission gear ratio that forms a mechanical point M1-1 at which the speed of the first motor generator 25 is zero, and the lower view illustrates a transmission gear ratio that forms a mechanical point M1-2 at which the speed of the second motor generator 17 is zero.

In the case where the power train of the present invention is in the first mode, the two mechanical points M1-1 and M1-2 shown in FIG. 12 are attained while the transmission gear ratio is varied. Supposing that no battery is provided between the first motor generator 25 and the second motor generator 17, that electricity that is generated at one side is completely consumed by the other side, so that the sum of the generated and wasted amounts is zero, and that energy loss for maintaining the speed of the motor generator at zero is negligible, the efficiency of the power train becomes 1, which is the maximum value, at the two mechanical points. This is confirmed in the graph of FIG. 14, which illustrates the efficiency of the power train depending on variation in the transmission gear ratio.

Figure 14:
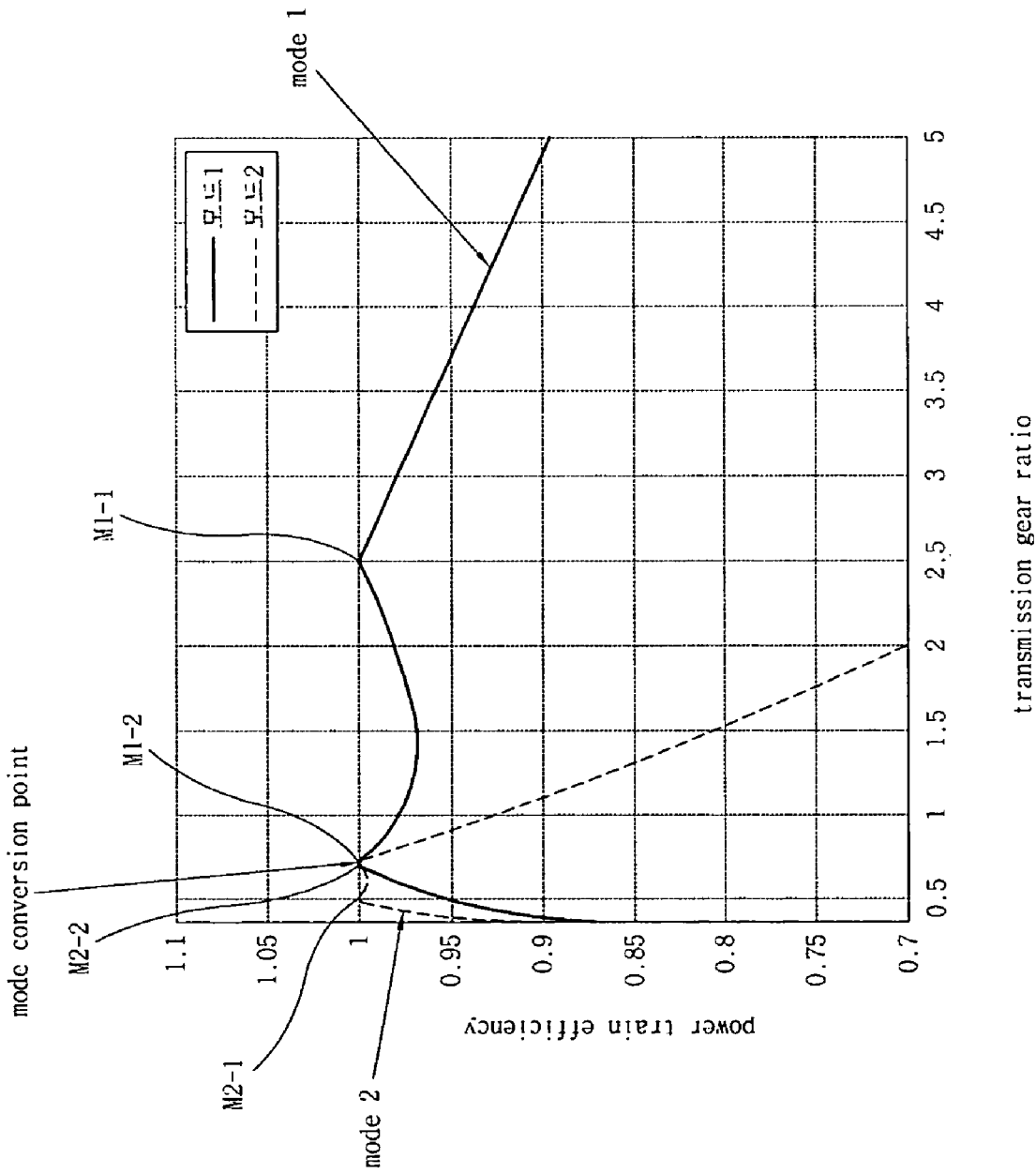
FIG. 14 is a graph showing the efficiency of the power train as a function of transmission gear ratio according to a method of controlling the power train of the second embodiment.

Referring to FIG. 14, it can be seen that the line that shows the efficiency in the first mode attains the maximum efficiency value of "1" twice. Furthermore, it can be seen that the positions at which the efficiency of the power train is maximum are the two mechanical points M1-1 and M1-2 of the power train in the first mode. In addition, it can be seen that the efficiency in the first mode is lower than in the second mode in the region in which the transmission gear ratio is reduced from the position designated as a mode conversion point, and the efficiency in the first mode is higher than in the second mode in the region in which the transmission gear ratio is increased from the mode conversion point.

For reference, in FIGS. 11 through 13, the character O denotes output, I denotes input (engine), MG1 denotes the first motor generator, and MG2 denotes the second motor generator. I is spaced apart from O by a distance of 1.

When a distance from O to MG1 is α and a distance from O to MG2 is β, in the case of the first mode, α=−0.667 and β=3.5. In the case of the second mode, α=−2.111 and β=−3.5. It is understood that both the first mode and the second mode are the compound split modes because α and β are not zero. The distances from O to 1, MG1 and MG2 correspond to gear ratios in the real power train. The graph of FIG. 14 is defined by Equation. 1, in the same manner as in the first embodiment.

In FIG. 13, the upper view illustrates a transmission gear ratio that forms a mechanical point M2-1 at which the speed of the first motor generator 25 is zero, and the lower view illustrates a transmission gear ratio that forms a mechanical point M2-2 at which the speed of the second motor generator 17 is zero.

In the case where the power train of the present invention is in the second mode, the two mechanical points M2-1 and M2-2 shown in FIG. 13 are attained while the transmission gear ratio is varied. Supposing that no battery is provided between the first motor generator 25 and the second motor generator 17, that electricity that is generated at one side is completely consumed by the other side, so that the sum of the generated and wasted amounts is zero, and that energy loss for maintaining the speed of the motor generator at zero is negligible, the efficiency of the power train becomes 1, which is the maximum value, at the two mechanical points. This is confirmed in the graph of FIG. 14, which illustrates the efficiency of the power train depending on variation in the transmission gear ratio.

Referring to FIG. 14, it can be seen that the line that shows the efficiency in the second mode attains the maximum efficiency value of "1" twice. Furthermore, it can be seen that the positions at which the efficiency of the power train is maximum are the two mechanical points M2-1 and M2-2 of the power train in the second mode, and, at the position designated as the mode conversion point, the efficiency of the power train in the first mode is maximum and, simultaneously, the efficiency thereof in the second mode is also maximum, that is, the mechanical points M1-2 and M2-2 are the same. Furthermore, it is understood that, because the mechanical point M2-1, at which the efficiency of the power train is maximized, is located to the left of the mode conversion point, the efficiency of the power train in the second mode is higher than in the first mode in the left region relative to the mechanical point.

The mode conversion point corresponds to a transmission gear ratio at which the speed of the second motor generator 17 in the first mode becomes zero, and also corresponds to a transmission gear ratio at which the speed of the second motor generator 17 in the second mode becomes zero.

Therefore, in the present invention, on the basis of the mode conversion point, which is the mechanical point at which the speed of the second motor generator 17 is zero, in the region where the transmission gear ratio is higher, the first clutch 33 is disengaged and the second clutch 35 is engaged such that the power train is operated in the first mode. In the region where the transmission gear ratio is lower, the first clutch 33 is engaged and the second clutch 35 is disengaged such that the power train is operated in the second mode. Thus, the range of the transmission gear ratio in which the efficiency of the power train is superior is increased, so that the power train can maintain a relatively high efficiency even though the transmission gear ratio is varied.

That is, when a relatively high transmission gear ratio is required because the vehicle is moving at a low speed, the first mode is used. When a relatively low transmission gear ratio is required because the vehicle is moving at a high speed, the second mode is used.

In the first mode and the second mode, the first motor generator 25 and the second motor generator 17 alternately conduct charging and discharging depending on the transmission gear ratio. The power generated by the first or second motor generator 25 or 17 is added to the power of the engine 1 and transmitted to the drive wheel 13.

Figure 15:
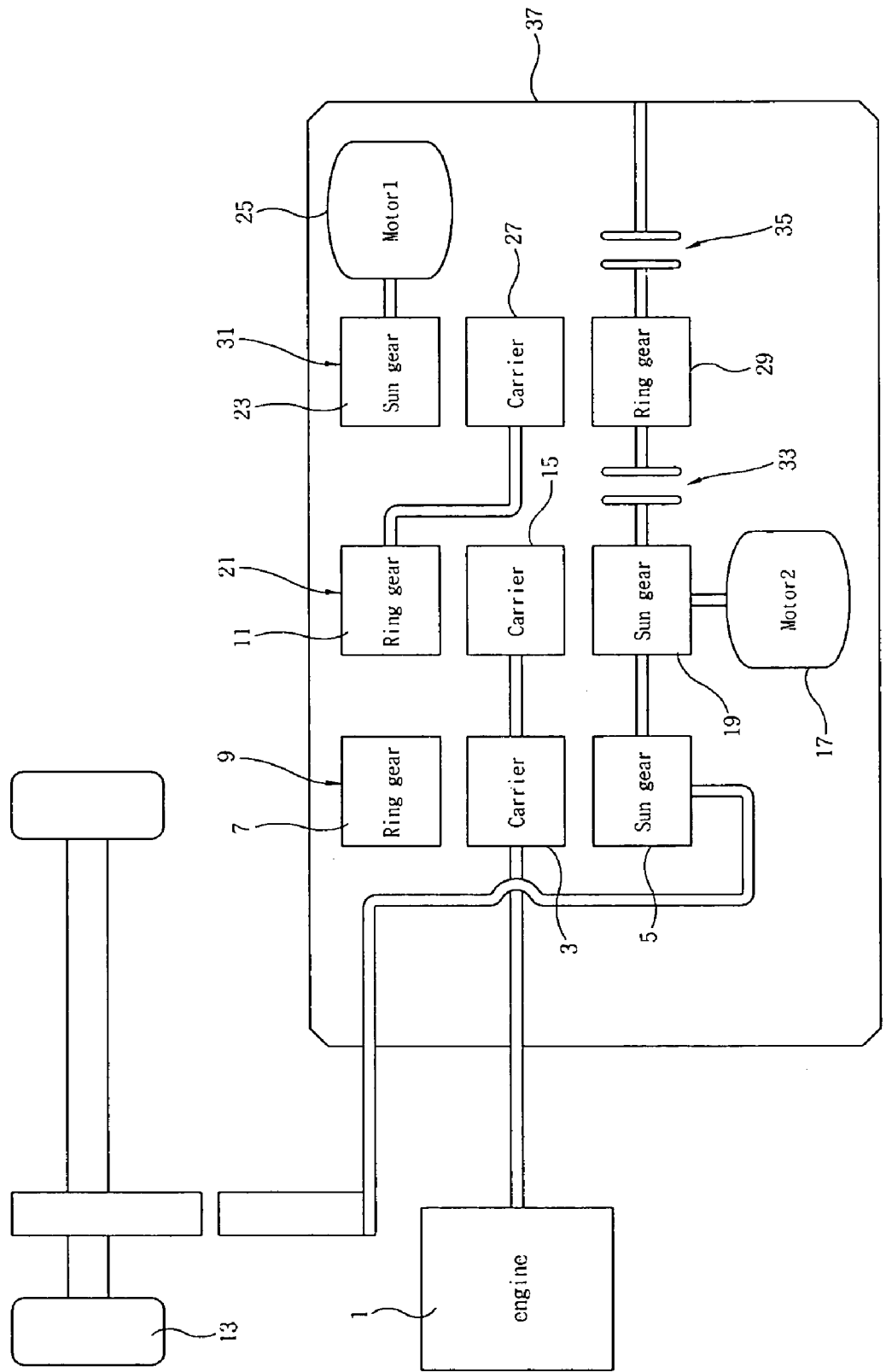
FIG. 15 is a schematic diagram of a power train having dual modes for hybrid electric vehicles, according to a third embodiment of the present invention.

Referring to FIG. 15, a power train according to a third embodiment of the present invention includes a first planetary gear set 9, a second planetary gear set 21, a third planetary gear set 31, a first clutch 33 and a second clutch 35. The first planetary gear set 9 includes a first carrier 3 coupled to an engine 1, a first sun gear 5 coupled to a drive wheel 13, and a first ring gear 7. The second planetary gear set 21 includes a second sun gear 19 coupled to a second motor generator 17, a second carrier 15 coupled to the first carrier 3, and a second ring gear 11 coupled to the first ring gear 7. The third planetary gear set 31 includes a third sun gear 23 coupled to a first motor generator 25, a third carrier 27 coupled to the second ring gear 11, and a third ring gear 29. The first clutch 33 couples or decouples the second sun gear 19 of the second planetary gear set 21 to or from the third ring gear 29 of the third planetary gear set 31. The second clutch 35 converts the third ring gear 29 of the third planetary gear set 31 between a stationary state and a rotatable state.

That is, the first motor generator 25 is coupled to the third sun gear 23 of the third planetary gear set 31. The second motor generator 17 is coupled to the second sun gear 19 of the second planetary gear set 21. The first sun gear 5 of the first planetary gear set 9 is coupled to the drive wheel 13. The first carrier 3 of the first planetary gear set 9 is coupled to the second carrier 15 of the second planetary gear set 21. The first ring gear 7 of the first planetary gear set 9 is coupled to the second ring gear 11 of the second planetary gear set 21. The third carrier 27 of the third planetary gear set 31 is coupled to the second ring gear 11 of the second planetary gear set 21.

In this embodiment, the second clutch 35 is provided between a power train case 37 and the third ring gear 29 of the third planetary gear set 31 to convert the third ring gear 29 between a stationary state and a rotatable state relative to the power train case 37, in the same manner as that of the above-mentioned embodiments. The second clutch 35 may be provided between the third ring gear 29 and a separate vehicle body part other than the power train case 37. Each of the first planetary gear set 9, the second planetary gear set 21 and the third planetary gear set 31 comprises a single pinion planetary gear.

The operation and effect of the third embodiment are similar to those of the first and second embodiments, therefore further explanation is deemed unnecessary.

As is apparent from the foregoing, the present invention provides a power train for hybrid vehicles which increases the range of the transmission gear ratio within which the efficiency of the power train is superior, and in which a method of operating the power train is varied depending on the transmission gear ratio, so that the power train can be operated with superior efficiency.

Furthermore, because the mode which realizes superior efficiency of the power train is selected and the power train is operated in the selected mode, the maximum mechanical load applied to first and second motor generators is reduced. Therefore, the capacity of the motor generator can be reduced and still exhibit the same efficiency.

What is claimed is:

1. A power train having dual modes for hybrid electric vehicles, comprising:
    an engine;
    a first planetary gear set provided with a first carrier directly and permanently coupled to the engine;
    a second planetary gear set having a second sun gear;
    a third planetary gear set having a third ring gear;
    a first clutch directly coupled between the second sun gear of the second planetary gear set and the third ring gear of the third planetary gear set to couple or decouple the second sun gear of the second planetary gear set to or from the third ring gear of the third planetary gear set;
    a second clutch to convert the third ring gear of the third planetary gear set between a stationary state and a rotatable state;
    a first motor generator directly and permanently coupled to either a third sun gear or a third carrier of the third planetary gear set; and
    a second motor generator directly coupled to one of either a first sun gear of the first planetary gear set or the second sun gear of the second planetary gear set, wherein
    one element of either the first planetary gear set or the second planetary gear set is coupled to a drive wheel without connection to any other planetary gear set,
    two elements of the first planetary gear set are directly coupled to two respective elements of the second planetary gear set,
    a remaining one of the third sun gear and the third carrier of the third planetary gear set which is not coupled to the first motor generator is coupled to one of the elements of the first planetary gear set and the second planetary gear set.

2. The power train as defined in claim 1, wherein:
    the first motor generator is coupled to the third carrier of the third planetary gear set,
    the second motor generator is coupled to the second sun gear of the second planetary gear set,
    a second carrier of the second planetary gear set is coupled to the drive wheel,
    the first sun gear of the first planetary gear set is coupled to a second ring gear of the second planetary gear set,
    a first ring gear of the first planetary gear set is coupled to the second carrier of the second planetary gear set, and
    the third sun gear of the third planetary gear set is coupled to the second ring gear of the second planetary gear set.

3. The power train as defined in claim 2, wherein the second clutch is provided between a power train case and the third ring gear of the third planetary gear set.

4. The power train as defined in claim 2, wherein each of the first, second and third planetary gear sets comprises a single pinion planetary gear.

5. A method for controlling the power train of claim 2, wherein, relative to a mechanical point at which a speed of the second motor generator is zero, in a portion of a high transmission gear ratio region, engaging the first and second clutches, and, in a low transmission gear ratio region, disengaging the first clutch and engaging the second clutch.

6. The method as defined in claim 5, wherein, in the high transmission gear ratio region relative to the mechanical point at which the speed of the second motor generator is zero, depending on an increase in a transmission gear ratio of the power train, when efficiency of the power train in a state such that the first clutch is disengaged and the second clutch is engaged is higher than efficiency of the power train in a state such that the first clutch is engaged and the second clutch is disengaged,
    disengaging the first clutch and engaging the second clutch.

7. The power train as defined in claim 1, wherein:
    the first motor generator is coupled to the third carrier of the third planetary gear set,
    the second motor generator is coupled to the first sun gear of the first planetary gear set, a second ring gear of the second planetary gear set is coupled to the drive wheel, the first sun gear of the first planetary gear set is coupled to the second sun gear of the second planetary gear set, the first carrier of the first planetary gear set is coupled to a second carrier of the second planetary gear set, and the third sun gear of the third planetary gear set is coupled to a first ring gear of the first planetary gear set.

8. The power train as defined in claim 7, wherein the second clutch is provided between a power train case and the third ring gear of the third planetary gear set.

9. The power train as defined in claim 7, wherein each of the first, second and third planetary gear sets comprises a single pinion planetary gear.

10. A method for controlling the power train of claim 7, wherein, relative to a mechanical point at which a speed of the second motor generator is zero, in a high transmission gear ratio region, disengaging the first clutch and engaging the second clutch, and, in a low transmission gear ratio region, engaging the first clutch and disengaging the second clutch.

11. The power train as defined in claim 1, wherein:

the first motor generator is coupled to the third sun gear of the third planetary gear set, the second motor generator is coupled to the second sun gear of the second planetary gear set, the first sun gear of the first planetary gear set is coupled to the drive wheel, the first carrier of the first planetary gear set is coupled to a second carrier of the second planetary gear set, a first ring gear of the first planetary gear set is coupled to a second ring gear of the second planetary gear set, and the third carrier of the third planetary gear set is coupled to the second ring gear of the second planetary gear set.

12. The power train as defined in claim 11, wherein the second clutch is provided between a power train case and the third ring gear of the third planetary gear set.

13. The power train as defined in claim 11, wherein each of the first, second and third planetary gear sets comprises a single pinion planetary gear.

* * * * *